United States Patent Office 2,914,535
Patented Nov. 24, 1959

---

2,914,535

5-CARBALKOXY-4-ALKYL-2-THIAZOLE-SULFENAMIDES

John J. D'Amico, Nitro, W. Va., assignor to Monsanto Chemical Company, St. Louis, Mo., a corporation of Delaware No Drawing. Application December 31, 1956
Serial No. 631,441

2 Claims. (Cl. 260—302)

This invention relates to 5-carbalkoxy-4-alkyl-2-thiazolesulfenamides represented by the formula

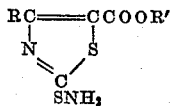

where R and R' represent lower alkyl groups. These compounds possess unusual stability and are excellent accelerators for vulcanization of natural and synthetic diene hydrocarbon rubbers. Heretofore, no stable thiazole sulfenamide has been found. Substitution of one or both the amide hydrogen atoms has been necessary. For example, 4,5-dimethylthiazolesulfenamide decomposes upon standing under ordinary conditions over a one week period whereas the new compounds are stable indefinitely. They may be prepared by oxidative condensation of the mercaptothiazole and ammonia.

To a suitable reactor containing 750 ml. of concentrated ammonium hydroxide there were added concurrently an aqueous solution comprising 50.8 grams (0.25 mole) of 5-carbethoxy-4-methyl-2-thiazolethiol (Levi, Gazz. Chem. Ital. 61, p. 723, 1931), 40.0 grams (0.25 mole) of 25% sodium hydroxide and 100 ml. of water, and 148 ml. (15.1 g./100 ml.) of sodium hypochlorite. The temperature was held at 0–5° C. during the addition which required 90 minutes. The reaction mixture was stirred for one hour longer and 4 grams of sodium sulfite then added to destroy the excess hypochlorite. The product was collected by filtration, washed with water until free of chloride and air dried at room temperature. The 5-carbethoxy-4-methyl-2-thiazolesulfenamide was obtained in 73.5% yield, M.P. 124–125° C. Analysis gave 13.06% nitrogen and 29.14% sulfur as compared to 12.83% nitrogen and 29.38% sulfur calculated for $C_7H_{10}N_2O_2S_2$.

The new compounds are powerful accelerators with strong delayed action properties for butadiene-styrene copolymer rubber, natural rubber and other diene hydrocarbon rubbers. As illustrative of the accelerating activity rubber compositions were compounded comprising

| Stock | A | B |
|---|---|---|
| | Parts by weight | |
| Smoked sheet rubber | 100 | 100 |
| Carbon black (Philblack O) | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| 5-carbethoxy-4-methyl-2-thiazole-sulfenamide | 0.5 | 1.0 |

The stocks were vulcanized by heating for various periods of time in a press at 144° C. The modulus, tensile and scorch properties are set forth below:

| Stock | Mins. Cure | Modulus of Elasticity in lbs./in.² at Elongation of 300% | Tensile at Break in lbs./in.² | Ult. Elong., Percent | Mooney Scorch at 135° C. |
|---|---|---|---|---|---|
| A | 15 | 1,580 | 3,530 | 510 | |
|   | 30 | 2,130 | 3,650 | 470 | 9.9 |
|   | 60 | 2,200 | 3,420 | 440 | |
| B | 15 | 2,240 | 3,950 | 480 | |
|   | 30 | 2,500 | 3,700 | 420 | 9.6 |
|   | 60 | 2,510 | 3,530 | 400 | |

It is intended to cover all changes and modifications of the examples of the invention herein chosen for purposes of disclosure which do not constitute departures from the spirit and scope of the invention.

What is claimed is:
1. 5-carboloweralkoxy-4-loweralkyl-2-thiazolesulfenamide.
2. 5-carbethoxy-4-methyl-2-thiazolesulfenamide.

References Cited in the file of this patent

UNITED STATES PATENTS

| 2,419,294 | Skaptason | Apr. 22, 1947 |
| 2,459,736 | Smith | Jan. 18, 1949 |
| 2,459,763 | Heywood | Jan. 18, 1949 |
| 2,700,659 | Carr | Jan. 25, 1955 |
| 2,704,761 | D'Amico | Mar. 22, 1955 |
| 2,721,868 | D'Amico | Oct. 25, 1955 |
| 2,766,237 | D'Amico | Oct. 9, 1956 |